United States Patent [19]

Yoda et al.

[11] Patent Number: 5,155,721
[45] Date of Patent: Oct. 13, 1992

[54] OPTICAL DATA STORAGE ACCESSING APPARATUS

[75] Inventors: Shigeru Yoda, Mishima; Kazuo Tsuboi, Takatsuki, both of Japan

[73] Assignee: Omron Tateisi Electronics Co., Kyoto, Japan

[21] Appl. No.: 830,463

[22] Filed: Feb. 6, 1992

Related U.S. Application Data

[63] Continuation of Ser. No. 572,345, Aug. 27, 1990, abandoned, which is a continuation of Ser. No. 344,460, Apr. 28, 1989, abandoned, which is a continuation of Ser. No. 94,745, Sep. 9, 1987, abandoned.

[30] Foreign Application Priority Data

Sep. 13, 1986 [JP] Japan ............................ 61-216200

[51] Int. Cl.$^5$ .............................................. G11B 7/00
[52] U.S. Cl. .................................... 369/110; 369/44.24
[58] Field of Search ............... 369/44.37, 44.38, 44.23, 369/44.24, 100, 109, 110, 112, 121, 122

[56] References Cited

U.S. PATENT DOCUMENTS

| | | | |
|---|---|---|---|
| 4,085,423 | 4/1978 | Tsunoda et al. | 369/109 |
| 4,100,577 | 7/1978 | Naruse et al. | 369/44.37 |
| 4,136,362 | 1/1979 | Naruse et al. | 369/110 |
| 4,167,024 | 9/1979 | Hamisch | 369/46 |
| 4,225,873 | 9/1980 | Winslow | 369/110 |
| 4,275,275 | 6/1981 | Bricot et al. | 369/109 |
| 4,334,300 | 6/1982 | Arquie et al. | 369/122 |
| 4,344,164 | 8/1982 | Bricot et al. | 369/110 |
| 4,399,529 | 8/1983 | Leterme et al. | 369/112 |
| 4,459,690 | 7/1984 | Corsover et al. | 369/46 |
| 4,502,762 | 3/1985 | Anderson | 369/44.37 |
| 4,530,080 | 7/1985 | Aoi et al. | 369/45 |
| 4,539,662 | 9/1985 | Hatano et al. | 369/46 |
| 4,546,463 | 10/1985 | Opheij et al. | 369/110 |
| 4,564,931 | 1/1986 | O'Hara | 369/110 |
| 4,621,351 | 11/1986 | Baer et al. | 369/44 |
| 4,700,336 | 10/1987 | Yoshida et al. | 369/110 |
| 4,721,850 | 1/1988 | Sakai et al. | 369/44 |
| 4,730,293 | 3/1988 | Pierce et al. | 369/44 |
| 4,752,922 | 6/1988 | MacAnally et al. | 369/110 |

FOREIGN PATENT DOCUMENTS

| | | | |
|---|---|---|---|
| 57-3230 | 1/1982 | Japan | 369/122 |
| 58-146038 | 8/1983 | Japan | 369/122 |
| 54-146039 | 8/1983 | Japan | 369/122 |
| 59-80424 | 4/1984 | Japan | |

OTHER PUBLICATIONS

Japanese Kokai Patent Publication (laid–open) No. 53-28405, publication date Mar. 16, 1978.
Japanese Kokai Patent Publication (laid–open) No. 52-85412, publication date Jul. 15, 1977.
European Search Report, Mar. 23, 1989, Berlin, B. Chaumeron.

*Primary Examiner*—Donald McElheny, Jr.
*Attorney, Agent, or Firm*—Dickstein, Shapiro & Morin

[57] ABSTRACT

An optical data storage accessing apparatus which includes a first light projecting unit including a laser diode for projecting data recording light onto a data storage medium, a second light projecting unit for projecting data recording light onto the data storage medium, and a light receiving unit. The light receiving unit receives the data reading light after it is reflected by the data storage medium to read data recorded on the data storage medium. An optical unit joins the data recording light and the data reading light and separates data reading light reflected from the data storage medium from the data recording light.

2 Claims, 3 Drawing Sheets

OPTICAL DATA STORAGE ACCESSING APPARATUS

This application is a continuation of application Ser. No. 572,345 filed Aug. 27, 1990, abandoned, which is a continuation of application Ser. No. 344,460 filed Apr. 28, 1989, abandoned, which is a continuation of application Ser. No. 094,745 filed Sep. 9, 1987, abandoned.

BACKGROUND OF THE INVENTION

1. Field of the Invention

This invention relates to an optical data storage accessing apparatus which employs a head for reading or writing data on an optical data storage medium, and more particularly, to an improved optical data storage accessing apparatus which employs two optical systems, one for data recording and the other for data reading.

2. Discussion of the Related Art

An optical card accessing apparatus which employs a laser diode for data recording and a light emitting diode (LED) for data reading is well known. Data recording light (hereinafter referred to as recording light) which is linearly polarized and emitted from the laser diode of a recording optical system is collimated by a collimating lens. Data reading light (hereinafter referred to as reading light) emitted from the LED of a reading optical system is collimated by another collimating lens. The recording and reading light are projected through a polarization beam splitter. The polarization direction of the recording light is set such that all of the recording light propagates through the polarization beam splitter. About fifty percent of the reading light emitted from the LED joins the recording light in the polarization beam splitter and reflects off the splitter. The joined recording and reading light propagate through a nonpolarization beam splitter and further through a condenser lens to reach the optical card. The nonpolarization beam splitter is used to separate the reading light reflected by the optical card from the recording light.

The recording light forms a first light spot $SP_1$ for data recording on a data storage area of the optical card. The reading light forms a second light spot $SP_2$ for data reading, which follows the first optical spot on the data storage area.

In this apparatus, the optical card is moved in a given direction relative to the optical head and data (a data unit is called a pit) are thermally irreversibly recorded on the data storage area using the first light spot $SP_1$. After the data recording operation, the second light spot $SP_2$ is projected onto the data storage area. A light receiving system, which includes a condenser lens and a light detector, receives the reading light reflected by the data storage area to check for pits or to detect pit lengths. Thus, the data recording and monitoring of the data can be done during a one-directional movement of the card.

The data are sometimes incorrectly recorded because a laser diode for the recording operation often deteriorates with time or due to changes of temperature, and the data storage area of the card often collects dust. An apparatus with two optical systems can quickly check for incorrect data because the apparatus monitors the recorded data immediately after the recording.

The first light spot $SP_1$ for data recording is required to have at least a predetermined energy density to form thermally irreversible pits on the data storage area of the optical card. In the conventional systems, however, the energy density of the first light spot $SP_1$ often becomes lower than the predetermined density because only about fifty percent of the recording light can pass through the nonpolarization beam splitter. Consequently, the data are often incorrectly recorded. If a second polarization beam splitter is used instead of a nonpolarization beam splitter, the energy density of the recording light is increased. In this case, however, since about fifty percent of the reading light is reflected by the first polarization beam splitter and almost all of the remaining reading light is further reflected by the second splitter, almost all of the reading light is hindered from reaching the optical card. Therefore, no data can be read.

Thus, use of a nonpolarization beam splitter for separating the reflected reading light lowers the recording efficiency. Moreover, a laser diode with higher power is required to offset the lowered recording efficiency. However, since the price of a laser diode exponentially increases as the rated power thereof increases, the cost of the apparatus dramatically increases even with only a slight increase in the power of the laser diode.

SUMMARY OF THE INVENTION

It is, therefore, an object of this invention to provide an optical data storage accessing apparatus which has high recording efficiency.

It is another object of this invention to provide an optical data storage accessing apparatus which employs a laser diode with low power so as to reduce dramatically the cost thereof.

According to this invention, there is provided an optical data storage accessing apparatus for optically reading or recording data on a data storage medium which is moved relative to the apparatus. The apparatus includes (1) a first light projecting means including a laser diode for projecting data recording light onto a data storage medium, (2) a second light projecting means for projecting data reading light onto the data storage medium, (3) a light receiving means for receiving the data reading light reflected by the data storage medium to read data recorded thereon, and (4) an optical member for mixing the data recording and reading light and for separating the reflected data reading light from the data recording light.

BRIEF DESCRIPTION OF THE DRAWINGS

The above and other objects, advantages and features of this invention will be more fully understood when considered in conjunction with the following figures, of which.

DETAILED DESCRIPTION OF THE INVENTION

Figure 1:
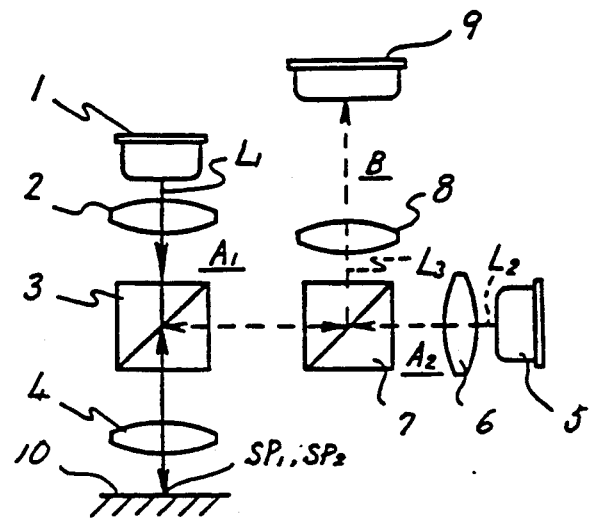
FIG. 1 is a side view of a first embodiment of the invention.

FIG. 1 shows an optical data storage accessing apparatus according to a first embodiment of the invention. This apparatus has a first light projecting system $A_1$ for projecting recording light $L_1$ on a data storage medium 10 to record data thereon, a second light projecting system $A_2$ for projecting reading light $L_2$ onto medium 10, and a light receiving system B for receiving the light reflected by medium 10.

The first light projecting system $A_1$ uses a laser diode 1 as its light source. Recording light $L_1$ emitted from laser diode 1 is collimated by a collimating lens 2 and propagated through a polarization beam splitter 3. The recording light $L_1$ is condensed by a condenser lens 4 to project a first light spot $SP_1$ with a diameter of about 1 micron on medium 10. Light spot $SP_1$ is used to form thermally irreversible pits on medium 10. The reflectivity of a pit is lower than that of the surrounding area.

Second light projecting system $A_2$ uses an LED 5 as its light source. Reading light $L_2$ emitted from LED 5 is collimated by a collimating lens 6 and propagated through a nonpolarization beam splitter 7 which separates the amplitude of light $L_2$ into two beams based on a difference in refractive indices. This type of beam splitter is exemplified by the conventional half mirror shown in FIG. 1 and will be referred to herein as a non-polarization, refractive beam splitter. Reading light $L_2$ further enters beam splitter 3. Beam splitter 3 is used not only to join the recording light $L_1$ and reading light $L_2$ but to separate reflected reading light $L_3$ from recording light $L_1$.

Reading light $L_2$ reflected by the beam splitter 3 is condensed by condenser lens 4 to project a second light spot $SP_2$ with a diameter on the order of dozens of microns onto medium 10. Second light spot $SP_2$ is projected immediately after the projection of first light spot $SP_1$. Second light spot $SP_2$ is used to check for pits or to detect pit lengths for identifying the contents of recorded data.

Reflected reading light $L_3$ from medium 10 propagates through lens 4 and is sequentially reflected by polarization beam splitter 3 and nonpolarization beam splitter 7. Reading light $L_3$, reflected by beam splitter 7, is condensed by a condenser lens 8. Condensed light $L_3$ is received by a light detector 9 to check for pits or to detect pit lengths for identifying the contents of recorded data.

In this embodiment, since recording light $L_1$ does not propagate through nonpolarization beam splitter 7, the recording efficiency of light projecting system $A_1$ is about twice as high as in conventional systems. Therefore, the cost of the apparatus according to this invention is dramatically reduced because a low-power laser diode can be used for the recording operation.

Figure 2:
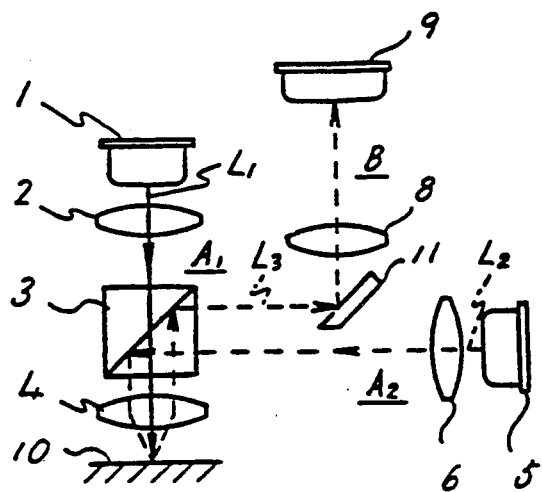
FIG. 2 is a side view of a second embodiment of the invention.

FIG. 2 shows an optical data storage accessing apparatus according to a second embodiment of the invention. Reading light $L_2$ emitted form LED 5 is collimated by collimating lens 6 and reflected by polarization beam splitter 3 toward condenser lens 4. Then, light $L_3$ is condensed by condenser lens 4 to project a light spot onto medium 10. As shown in FIG. 2, reflected reading light $L_3$ propagates through a path different from the path at the time of the projection, because the optical axis of reflected light $L_3$ deviates from that of reading light $L_2$. Light $L_3$ is further reflected by beam splitter 3 toward a reflecting mirror 11. Light $L_3$ reflected by reflecting mirror 11 is condensed by condenser lens 8 and received by the light detector 9.

In this second embodiment, since reflecting mirror 11 is used instead of a nonpolarization beam splitter 7, the reading efficiency of reading light $L_2$ is about twice as high as that of reading light $L_2$ according to the first embodiment and a third embodiment described below.

In addition, the cost of the apparatus can be reduced because mirror 11 is inexpensive.

The other elements of the FIG. 2 embodiment are the same as those of the FIG. 1 apparatus so that description thereof is omitted with respect to FIG. 2.

Figure 3:
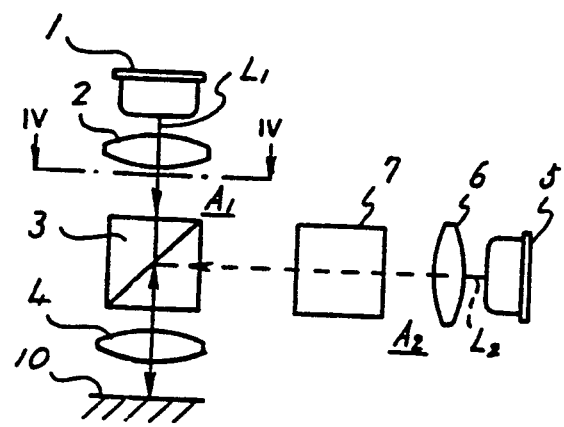
FIG. 3 is a side view of a third embodiment of the invention.
Figure 4:
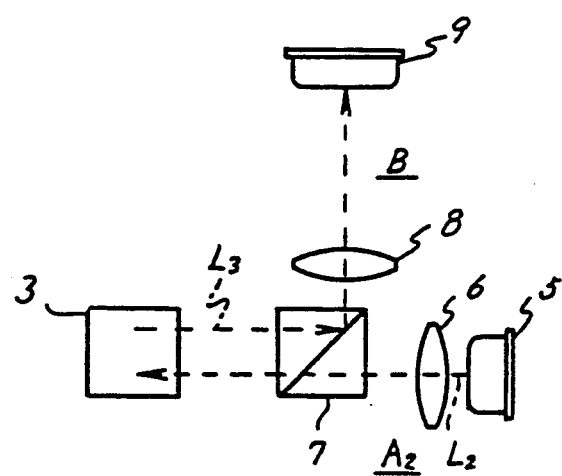
FIG. 4 is a view taken along a line IV—IV in FIG. 3.
Figure 5:
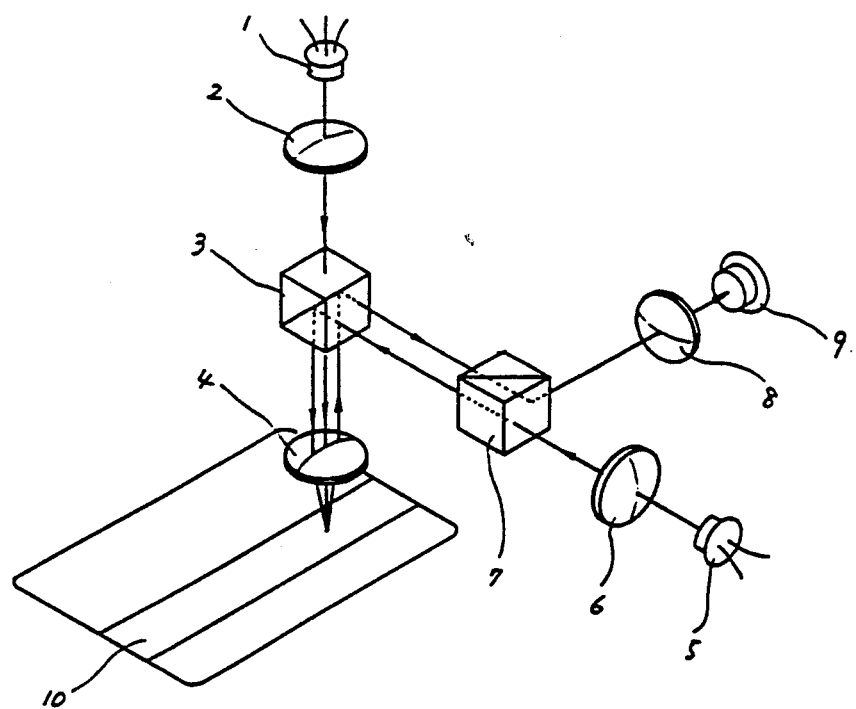
FIG. 5 is a perspective view of FIG. 3.

FIGS. 3–5 show an optical data storage accessing apparatus according to the third embodiment of the invention. In the first and second embodiments, first light projecting system $A_1$ and light receiving system B are disposed perpendicularly to the surface of medium 10. In the FIGS. 3–5 embodiment, however, light receiving system B is disposed parallel to the surface of medium 10. Therefore, the apparatus can be made thinner. Although in this embodiment the paths for reading light $L_2$ and for reflected reading light $L_3$ are different from each other between beam splitters 3 and 7, the apparatus may be constructed such that light $L_2$ and light $L_3$ propagate through the same path.

In all the embodiments of FIGS. 1 to 5, like numerals designate like or corresponding components. The above description and the accompanying drawings are merely illustrative of the application of the principles of the present invention and are not limiting. Numerous other arrangements which employ the principles of the invention and which fall within its spirit and scope may be readily devised by those skilled in the art. Accordingly, the invention is not limited by the foregoing description, but is only limited by the scope of the appended claims.

What is claimed is:

1. An optical data storage accessing apparatus for optically reading and recording data on a data storage medium which is moved relative to said apparatus, said apparatus comprising:

(A) first light beam generating means including a laser diode for generating a data recording light beam and for propagating said data recording light beam along a first optical axis;

(B) second light beam generating means for generating a data reading light beam and for propagating said data reading light beam along a second optical axis, wherein said second light beam generating means includes a light source comprising a light emitting diode;

(C) a polarization beam splitter and a condensing lens, said polarization beam splitter being located on said first and second axes so as to receive said data recording and data reading light beams, said condensing lens being located between said polarization beam splitter and said data storage medium, said polarization beam splitter and said condensing lens being arranged with respect to said data storage medium and said first and second optical axes so as to:

(1) direct said data recording light beam from said first optical axis, along a third optical axis, and onto said data storage medium, and thereby record said data on said data storage medium;

(2) direct said data reading light beam from said second optical axis, along a fourth optical axis, and onto said data storage medium, such that a reflected data reading light beam is propagated away from said data storage medium and toward said polarization beam splitter along a fifth optical axis, said fifth optical axis being different from said fourth optical axis, said third optical axis being located between said fourth and fifth optical axes; and (3) direct said reflected data reading light beam away from said polarization beam splitter along a sixth optical axis, wherein said second and sixth optical axes are parallel;

(D) a light detecting means for detecting said reflected data reading light beam and for thereby reading said data; and (E) a reflecting mirror for reflecting said reflected data reading light beam onto said light detecting means, wherein said reflecting mirror is located on said sixth optical axis and is not located on said second optical axis; and wherein said apparatus further comprises a second condensing lens for condensing said reflected data reading light beam onto said light detecting means.

2. The apparatus as in claim 1, wherein said first and third optical axes are located on a common line.

* * * * *